(12) United States Patent
Venkatakrishnan et al.

(10) Patent No.: US 10,929,917 B2
(45) Date of Patent: Feb. 23, 2021

(54) ACCESSING CHAT SESSIONS VIA CHAT BOTS FOR CART GENERATION

(71) Applicant: PAYPAL, INC., San Jose, CA (US)

(72) Inventors: Poornima Venkatakrishnan, San Jose, CA (US); Teddy Vincent Toms, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 595 days.

(21) Appl. No.: 15/381,626

(22) Filed: Dec. 16, 2016

(65) Prior Publication Data
US 2018/0174222 A1 Jun. 21, 2018

(51) Int. Cl.
*G06Q 30/00* (2012.01)
*G06Q 30/06* (2012.01)
*H04L 12/58* (2006.01)

(52) U.S. Cl.
CPC ......... *G06Q 30/0633* (2013.01); *H04L 51/02* (2013.01); *H04L 51/04* (2013.01)

(58) Field of Classification Search
CPC .... G06Q 30/00; G06Q 30/0633; H04L 51/02; H04L 51/04
See application file for complete search history.

(56) References Cited

U.S. PATENT DOCUMENTS

| | | | | |
|---|---|---|---|---|
| 5,715,314 A * | 2/1998 | Payne | ............ | G06Q 10/087 705/26.35 |
| 7,343,328 B1 * | 3/2008 | Smith | ............ | G06Q 30/0603 705/26.41 |
| 8,121,970 B1 * | 2/2012 | Tung | ............ | G06Q 30/0603 706/47 |
| 9,135,345 B1 * | 9/2015 | Larsson | ............ | G06Q 30/02 |
| 2009/0327133 A1 * | 12/2009 | Aharoni | ............ | G06Q 20/10 705/44 |
| 2011/0082735 A1 * | 4/2011 | Kannan | ............ | G06Q 30/0222 705/14.23 |

(Continued)

OTHER PUBLICATIONS

"Former Google Eployees Improve Instant Messaging with imo. im." Tech N' Marketing. Mar. 11, 2010. <https://www.technmarketing.com/iphone/former-google-employees-improve-instant-messaging-with-imo-im/> (Year: 2010).*

(Continued)

*Primary Examiner* — Abby J Flynn
(74) *Attorney, Agent, or Firm* — Haynes and Boone LLP

(57) ABSTRACT

A method for accessing communication in chat sessions for cart generation is discussed. The method includes accessing, via a chat bot, a chat text in a chat session by a chat application instance to another chat application instance. The method includes determining intent for purchasing a product from a merchant based on an analysis of the chat text. In response to determining the intent, the method determines a locator for an online store of the merchant from the chat text. The method includes accessing, using the locator, the online store to determine product features of the product. Based on the product features and the chat text, a cart is generated for an order of the product for the online store. The method provides, via the chat bot, an indication of the cart to the chat session to obtain, from the first chat application instance, authorization to order the cart.

20 Claims, 6 Drawing Sheets

(56) References Cited

U.S. PATENT DOCUMENTS

| | | | | |
|---|---|---|---|---|
| 2016/0071095 A1* | 3/2016 | Foerster | ............... | G06Q 20/367 |
| | | | | 705/65 |
| 2016/0171478 A1* | 6/2016 | Kwon | .................... | G06Q 20/29 |
| | | | | 705/44 |
| 2016/0300185 A1* | 10/2016 | Zamer | .................... | H04W 4/029 |
| 2017/0068939 A1* | 3/2017 | Groarke | ................. | G06Q 20/20 |
| 2017/0083825 A1* | 3/2017 | Battersby | ................ | G06N 20/00 |
| 2017/0185236 A1* | 6/2017 | Yang | .................. | G06K 9/00671 |
| 2017/0279747 A1* | 9/2017 | Melzer | ................... | G06Q 30/06 |
| 2017/0357972 A1* | 12/2017 | Van Os | ................. | G06Q 30/06 |

OTHER PUBLICATIONS

"IMOM.IM Is the Best IM Web Service You've Never Heard Of." TechCrunch.com. Feb. 6, 2009. <https://techcrunch.com/2009/02/06/imoim-is-the-best-im-web-service-youve-never-heard-of/> (Year: 2009).*

* cited by examiner

ACCESSING CHAT SESSIONS VIA CHAT BOTS FOR CART GENERATION

BACKGROUND

Embodiments of the present disclosure generally relate to the field of communication systems and, more particularly, to communicating in chat sessions using chat bots.

Chat sessions facilitate communication between chat applications in a communication system. A user of a chat application can communicate, over a communication network, with a user of another chat application by transmitting communication to, and receiving communication from, the chat session. A chat bot can simulate a chat application to communicate with other chat applications using the chat session.

A user may directly, or indirectly (e.g., via a marketplace) access an online store of a merchant to purchase a product or a service. However, the user may find it difficult and time consuming to access merchants using alternate approaches. For example, the user may find it frustrating when needing to switch applications, i.e., stop using one chat application for accessing the chat session, and start another application for accessing a merchant's online store. That may discourage the user from using the chat session and/or from accessing the merchant's online store.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
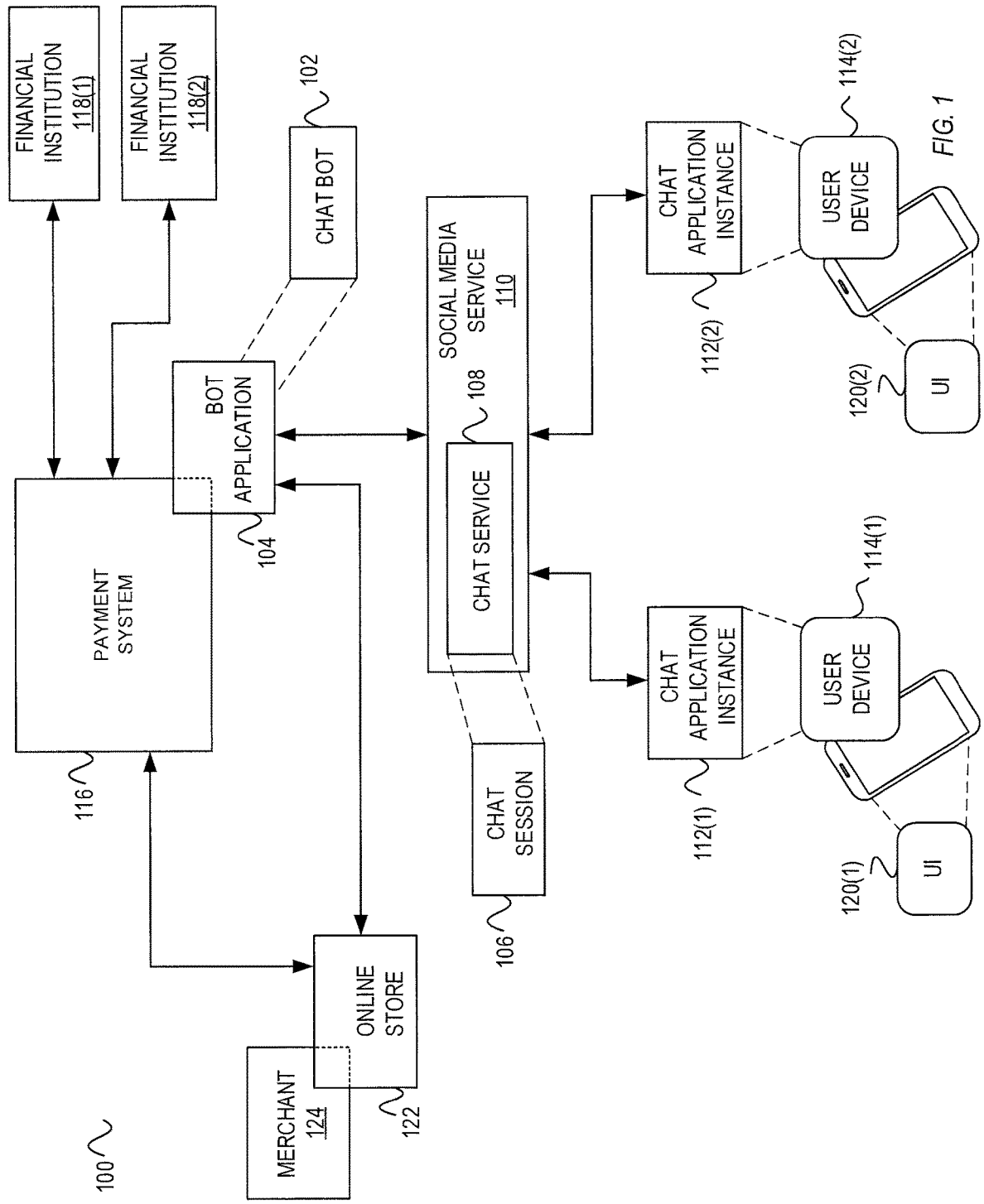
FIG. 1 is a system diagram illustrating embodiments of a communication system showing a bot application communicating using a chat session.

The description that follows includes exemplary systems, methods, techniques, instruction sequences, and computer program products that embody techniques of the present disclosure. However, it is understood that the described embodiments may be practiced without these specific details. For instance, although some examples refer to social media services, other types of media services are contemplated, such as online news services, other blogs, and/or other websites that can receive communication from users, and also facilitate displaying of content of such communication.

Chat sessions facilitate communication between instances of chat applications running on various devices in a communication system. A user of one instance of a chat application can communicate, over the communication system, with a user of another instance of a chat application by transmitting and receiving communication to/from the chat session. For example, the communication system facilitates the transmission of chat texts, over a communication network, between the instances of the chat applications and the chat session. The chat session, which can be hosted by a chat service, can facilitate communication between the multiple instances of the chat applications. Each chat application, such as a SLACK chat application, or a FACEBOOK MESSENGER application, can be hosted by a user device. In some cases, the communication may be between multiple instances of the same type of chat application. In other cases, the communication may involve instances of multiple different types of chat applications. The user device can be any type of a personal device such as a mobile phone, tablet, or other computing device.

Thus, for example, multiple SLACK chat application instances can communicate with each other by transmitting chat texts to, and receiving chat texts from, a SLACK chat session. The chat service can be a part of a social media service. For example, the chat service can be a SLACK chat service that is a part of a SLACK team collaboration tool, or a FACEBOOK MESSENGER chat service that is a part of a FACEBOOK social networking service. The chat service itself can be further hosted by a server or another type of a computing device.

A bot application can communicate, via a chat bot, with the chat session and simulate a chat application instance for communicating with the other chat application instances. For example, the bot application may simulate a SLACK chat application instance for communicating, via a SLACK chat session, with other SLACK chat application instances. The chat bot can send and receive chat texts from the chat session.

A user may also access an online store of a merchant to purchase a product or a service. The user may directly access the online store, or indirectly such as via a marketplace, to make such a purchase. However, in some instances the user may find it difficult and time consuming to access merchants when using a chat service. For example, the user may find it frustrating and inefficient to switch from using a chat application instance to access a chat session, to using another application to access a merchant online store. That may discourage the user from using the chat application, the chat session, and/or accessing the merchant online store.

In some embodiments, the bot application can access a chat text in a chat session that is provided between a chat application instance with another chat application instance. The bot application can analyze the chat text to determine whether the chat text indicates intent for purchasing a product from a merchant. In response to determining the intent, the bot application can determine a locator for an online store of the merchant from the chat text. The bot application can access, using the locator, the merchant's online store to determine product features of the product. Based on the product features and the chat text, the bot application can generate a cart for an order of the product at the merchant online store. The bot application can provide an indication of the cart to the chat session to obtain, from the chat application instance, authorization to order the cart. The following description, and associated Figures, illustrates various embodiments directed to the ideas listed above.

FIG. 1 is a system diagram 100 illustrating some embodiments of a communication system showing a bot application communicating using a chat session. In an overview of the system diagram 100, a chat bot 102 is hosted by a bot application 104. The bot application 104 communicates, via the chat bot 102, with a chat session 106. The chat session 106 is hosted by a chat service 108, which in turn is hosted by a social media service 110. Chat application instances 112(1) and 112(2) (e.g., instances of the same type of chat application, instances of more than one type of chat application) can communicate with each other via the chat session 106. For example, the chat application instance 112(1) can transmit a chat text to the chat session 106 for access by the chat application instance 112(2). The chat bot 102 simulates a chat application instance when communicating with the chat application instances 112(1) and 112(2). Each of the chat application instances 112(1) and 112(2) may be hosted by a respective user device 114(1) and 114(2). For example, the chat application instance 112(1) is hosted by the user device 114(1). Each of the user devices 114(1) and 114(2) can also display a user interface (UI) 120(1) and 120(2), respectively. Each of the UIs 120(1) and 120(2) can display visual elements, such as chat texts of the chat session 106. Each of the UIs 120(1) and 120(2) can also receive input from a user, such as a selection from a user. It is noted that each of the user devices 114(1) and 114(2) can also receive input from a user via other input elements, such as via a keyboard, mouse, microphone (e.g., from a voice command), among others.

A service or an application (such as the bot application 104) can be hosted by a combination of software and hardware. It is noted that the same term "hosting" is used herein to describe both software hosting and hardware hosting. When software hosting, a software service such as the chat service 108, can instantiate and manage multiple chat sessions, such as the chat session 106 and other chat sessions. When hardware hosting, a computing device (such as a server or a user device) can provide resources such as memory, communication, and execution resources for execution of instructions.

The bot application 104 can interface with a payment system 116 to provide instructions to the payment system 116 and receive financial information regarding users from the payment system 116. The payment system 116 can provide financial services, such as a fund transfer (e.g., a transfer of a certain monetary amount), to users. The payment system 116 can include payment accounts, each of which can be associated with a user. For example, a first user can be associated with a first payment account, and a second user (e.g., the merchant 124) can be associated with a second payment account (e.g., a merchant payment account) at the payment system 116. The payment system 116 can facilitate the fund transfer from the first payment account to the second payment account. The payment system 116 can receive instructions from the bot application 104 to transfer money from a payment account that is linked with a first chat account (i.e., with a first user) to another payment account that is linked with another chat account (i.e., with another user or a merchant). The payment system 116 can be implemented by PAYPAL or another online payment system that allows users to send, accept, and request fund transfers.

A merchant 124 can be a business that provides goods or services to users. The merchant 124 can have an online store 122 that facilitates business activity online, e.g., on the Internet. The online store 122 can provide functionality for a user to configure a product or a service, and/or place the product or service in a cart to order the product or service. The online store 122 can provide functionality for the user to select a type of payment for the cart, and to submit the payment such that the products in the cart can be shipped to a shipping address specified by the user, or to schedule the service. The online store 122 can receive the payment from the payment system 116. The merchant 124 can have a payment account at the payment system 116, and thus can receive the payment as a transfer of funds from a buyer's payment account to the merchant payment account at the payment system 116.

In some embodiments, the online store 122 can receive the cart from the bot application 104. The bot application 104 can generate the cart and communicate the cart to the online store 122 for processing. The online store 122 can process the cart by authorizing the order(s) in the cart, by processing the payment for the cart, and/or by initiating shipping for the product(s) of the cart.

In the example illustrated in FIG. 1, the payment system 116 interfaces with one or more financial institutions, such as a financial institution 118(1) and a financial institution 118(2) (referred to collectively as financial institutions 118). Financial institutions 118 can provide financial services to users. Financial institutions 118 can be implemented as banks, credit unions, other deposit-taking institutions that accept and manage deposits and make loans, and other financial service providers. In some embodiments, financial institutions 118 can include credit card networks, e.g., for funding transfer of money between users. In some embodiments, financial institutions 118 may include a provider of purchasing power that is associated with a loyalty program. In one embodiment, the payment system 116 can access funds associated with the first payment account (of the payment system 116) by accessing the financial institution 118(1), and transfer these funds to a second payment account of the payment system 116 by accessing the financial institution 118(2).

In one embodiment, the bot application 104 can be implemented as a part of the payment system 116. For example, a server that hosts the payment system 116 can also host the bot application 104. The server can be implemented on a single computing device, or on multiple computing devices (e.g., using distributed computing devices or a cloud service). In another embodiment, the bot application 104 is separate from the payment system 116. The bot application 104 can instantiate the chat bot 102, as well as other chat bots.

The bot application 104 can access, via the chat bot 102, chat texts in the chat session 106. The chat texts are provided to the chat session 106 by the chat application instances 112. The chat application instance 112(1) can be associated with a first chat account, and the chat application instance 112(2) can be associated with a second chat account. The bot application 104 can determine whether the chat texts indicate the purchase intent, i.e., intent (by one of the chat application instances) to purchase a product (or a service) from a merchant 124.

For example, the bot application 104 can perform natural language processing (NLP) on a chat text that is provided by the chat application instance 112(1). Based on the NLP, the bot application 104 can determine whether a user of the user device 114(1) intends to purchase an item that is discussed in the chat texts. The bot application 104 can also perform other analysis, such as search for certain text strings that indicate intent to purchase, including "buy," "purchase," "want," "need," and others. In some embodiments, bot application 104 may utilize various customized dictionaries for the NLP based on the user, user device, chat application, etc. In some embodiments, different customized dictionaries, or different customizations of a particular dictionary, may be utilized for the same user (e.g., based on the chat application, user device, or other factor). Accordingly, the NLP performance may be optimized based on various factors.

A payment account may be linked with a chat account when the bot application 104 includes an association between the chat account at the chat service 108, and the payment account at the payment system 116, both for the same user. In one embodiment, a payment account is linked with a chat account when the bot application 104 can also access configuration information for the chat account at the chat service 108 and/or for the payment account at the payment system 116, both for the same user. For a payment between a user of the user device 114(1) and the merchant 124, the bot application 104 can perform a fund transfer between the payment account linked to the chat account for that user and a merchant payment account.

Figure 2:
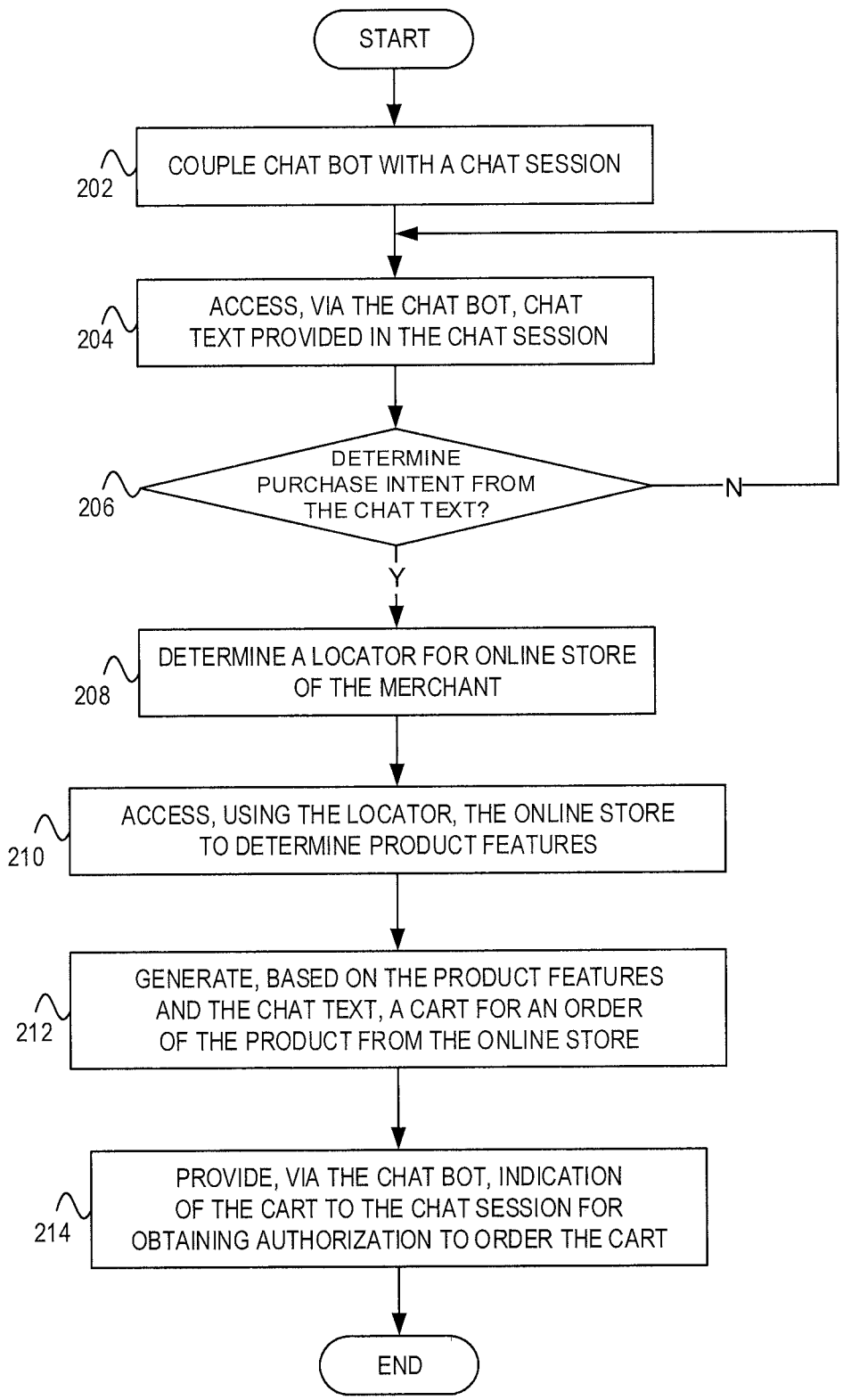
FIG. 2 is a flow diagram illustrating embodiments of operations for accessing chat sessions for cart generation.

FIG. 2 is a flow diagram illustrating embodiments of operations for accessing chat sessions for cart generation. The method of FIG. 2 is described with reference to the systems and components described in FIG. 1 (for illustration purposes and not as a limitation). The example operations can be carried out by the bot application 104.

Beginning with 202, a chat bot is coupled with a chat session. For example, the chat bot 102 can be coupled with the chat session 106. In some cases, multiple chat bots can be coupled with multiple chat sessions. For example, the chat bot 102 can also couple with additional chat sessions (not shown) that may be provided by the social media service 110 and/or another social media service(s) (not shown). Coupling of a chat bot with a chat session can include registering with a chat session and configuring the chat bot for communication using the chat session.

Figure 3:
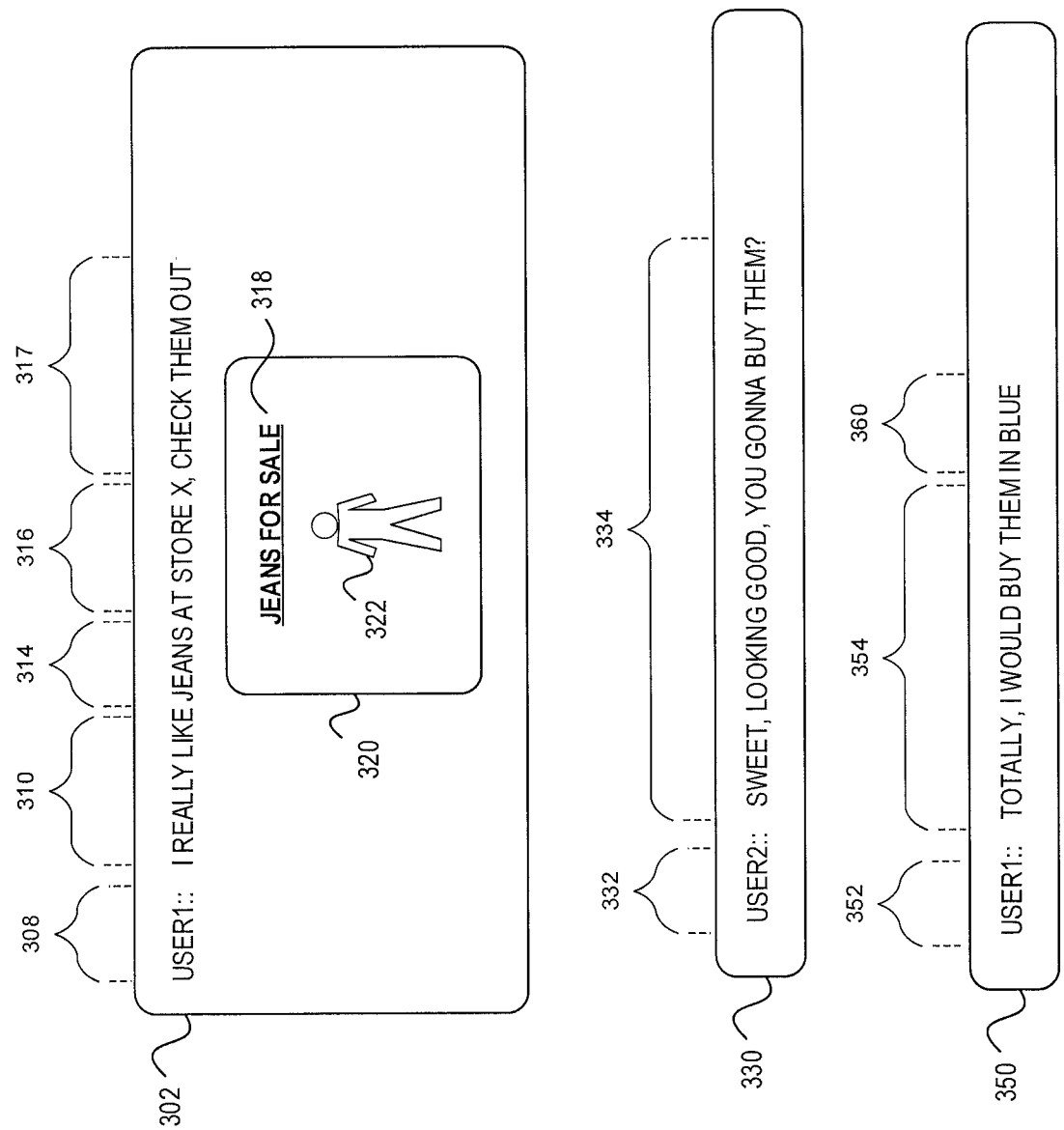
FIGS. 3 and 4 illustrate embodiments of communication for accessing chat sessions for cart generation via a chat bot.

At 204, the bot application accesses, via the chat bot, a chat text provided in the chat session. For example, the bot application 104 can access, via the chat bot 102, chat text provided in the chat session 106. With reference to FIG. 3, the content of the chat text 302 (and optionally the chat text 350) can be accessed by the bot application as a single chat text.

In some embodiments, at 204, the bot application 104 can also determine that the chat texts discuss a product or a service. For example, with reference to FIG. 3, the bot application 104 can determine that a user has expressed general interest in certain product (i.e., jeans as shown at a portion 322 of the chat text 302). The bot application 104 can determine the user's general interest in the certain product (or service) based on links that are posted in the chat text 302, such as shown by a portion 320. Additionally or alternatively, the bot application 104 can determine the user's general interest in a certain product (or service) based on analysis of the text of the chat text (e.g., "I really like jeans at store X"). Once the bot application 104 determines general interest by the user in a certain product (or service), the bot application 104 can closely monitor the chat session for additional chat texts that may indicate the purchase intent for that product or service. With reference to FIG. 3, the bot application 104 can monitor additional chat texts of 330 and 350.

At 206, the bot application determines whether the chat text indicates purchase intent. For example, the bot application 104 can determine whether chat texts between the chat application instances 112(1) and 112(2) indicate intent by one of the users to purchase a product (or service) that is discussed in the chat texts. At 206, the bot application 104 does not need to provide any chat texts (i.e., via the chat bot 102) to the chat session 106. In the alternative, at 206, the bot application can provide chat text(s) to the chat session 106 requesting confirmation of intent to purchase a product and/or service. With reference to FIG. 3, the bot application 104 can access (via the chat bot 102) chat texts 330 and/or 350 to determine the purchase intent. In some examples, the bot application 104 can access the same chat text as accessed at 204 to determine the purchase intent.

In some embodiments, the bot application 204 can apply natural language processing on the chat text to determine an interest level in the product (or service) by the user of the chat application instance 112(1). The bot application 204 can determine whether the interest level is greater than an interest threshold. If the bot application 204 determines that the interest level is greater than the interest threshold, the bot application 204 can determine that the chat application instance 112(1) has indicated the purchase intent. The interest threshold can be a value that is predetermined, or that is determined dynamically, such as based on a type of the product (or service) being discussed in the chat texts and/or the content of the text. For example, if a product is mentioned multiple times, or analysis of the chat text indicates a user's enthusiasm for making a purchase.

In some embodiments, the bot application 104 can determine the purchase intent by recognizing particular characters, words, phrases, patterns, emojis, and/or other symbols within the chat texts. The bot application 104 can analyze the chat texts for determining purchase intent by searching for certain text strings that can indicate the purchase intent, text strings including "buy," "purchase," "want," "need," among others. If the bot application 104 finds certain text strings in the chat session 106 provided by the chat application instance 112(1), the bot application 104 can determine that the chat application instance 112(1) has indicated the purchase intent. If the bot application determines the purchase intent from the chat texts, the flow continues at 208, otherwise the flow continues at 204 (where the chat texts provided in the chat session can be accessed and continually monitored).

At 208, once the bot application has determined an intent to purchase exists, the bot application determines a locator for an online store of the merchant. For example, the locator can be a webpage address, a link, and/or an identifier that identifies the merchant's online store 122. The webpage address can be implemented as a Uniform Resource Identifier (URI), such as a Uniform Resource Locator (URL). The URL can be an internet address of the merchant's online store. As another example, the locator can be a link that launches a program that accesses the online store, such as a link that launches an online store app (e.g., at the payment system 116 or at the user device 114(1)) that accesses the online store 122. Still as another example, the locator can be an identifier that points to, and allows the bot application 104 to access, the merchant's online store 122.

In some embodiments, the bot application 104 can determine the locator for the online store 122 by accessing the chat texts. With reference to FIG. 3, the bot application 104 can determine the locator from the chat text 302 (such as by accessing the chat text portion 320). The portion 320 can contain an URL of the merchant's online store at portion 318. For example, the bot application 104 can determine the locator for the online store 122 by determining that a mention of the merchant 124 was included in the chat texts.

In some embodiments, the bot application 104 can determine the locator for the online store by determining a candidate locator of the merchant based on the first chat text (e.g. if the portion 320 does not contain a URI of the merchant's online store 122). The bot application 104 can access a candidate webpage using the candidate locator. The bot application can compare an image of the candidate webpage with a merchant image accessed from the first chat text. With reference to FIG. 3, the merchant image can be the image at the portion 322 provided by the chat text 302. The merchant image can illustrate the product being discussed in the chat session. The bot application 104 can then determine whether the candidate image matches the merchant image. If the bot application 104 determines that the candidate image matches the merchant image (such as based on a match score indicating a degree of similarity between the images), the bot application 104 can determine the candidate locator as the locator for the online store. Otherwise, the bot application 104 can use another candidate locator, which can be a variation of the previous candidate locator, or a new candidate locator.

In some embodiments, the bot application 104 determines the locator for the online store by determining whether the merchant has an account (referred to as a merchant payment account) at the payment system. With reference to FIG. 1, the bot application 104 can determine whether the merchant 124 has an account at the payment system 116. The bot application 104 can determine an identity of the merchant based on the chat texts, such as by portion 320. If the merchant 124 has a merchant payment account at the payment system 116, the bot application 104 can access merchant's 124 configuration information at the payment system 116 to determine the locator.

At 210, the bot application accesses, using the locator, the merchant's online store to determine product features. Regardless of the locator type, the bot application 104 can access the product webpage at the online store 122 of the merchant to determine the product features. In some embodiments, the bot application 104 can also (or instead) determine the product features by accessing the merchant's 124 database (not shown) and/or Application Program Interface (API). In some embodiments, the bot application 104 can also (or instead) determine the product features by accessing a database (now shown) at the payment system 116 that may include information saved from previous accesses and/or purchases to the product webpage, the merchant's 124 database, and/or the merchant's 124 API.

The bot application 104 can access a product webpage at the online store 122 as indicated by the locator, and access tags associated with the product (or service). For example, the product webpage can include meta tags which can describe product features. The bot application 104 can access the tags to obtain product features such as color, size, type, and other features of the product. If the locator is for a service, then the bot application 104 can access the tags to obtain service features such as type, a service provider, a time/date of the service, among others. If the locator generally points to the merchant's online store 122, but not to the product, the bot application 104 can search for the product. (or service) at the online store 122 as indicated in the chat text. If the locator only point to a general website for the merchant 124, the bot application 104 can also search for the merchant's online store 122.

Tags can also point to elements of the product webpage that are shareable in chat sessions. With reference to FIG. 3, the bot application 104 can access the portion 320 that includes session tags. The session tags, such as FACEBOOK OPEN GRAPH, TWITTER CARDS, GOOGLE AUTHORSHIP TAGS, can indicate to the social media service 110 what elements of the product webpage can be displayed in the chat session 106. Thus, the chat text 302 that is provided by the chat application instance 112(1) can include the locator (e.g., at the portion 320), which can link to a product webpage that includes session tags. These session tags can be accessed by the social media service 110 (e.g., via the chat service 108) to display the image 322 of the product and/or various product features. The bot application 104 can also access the online store 122 using the locator to access the session tags. The bot application 104 can then use the session tags to obtain the product features.

At 212, the bot application generates, based on the product features and the chat text, a cart for an order of the product from the merchant's online store. The bot application 104 can generate the cart at the payment system 116 or at the online store 122. The bot application 104 can generate the cart for the order using the product features (e.g., as obtained at 210), and also based on the chat texts. The chat texts can provide additional information about the product, such as shown at 350 where the user indicates an additional feature for the product that may not have been included at the portion 320. However, in some situations the chat texts may not provide any additional information about the product.

If the bot application 104 generates the cart at the payment system 116, the payment system 116 can generate a token, such as an order token. The token can be for associating the cart at the payment system 116 with the chat applicant instance 112(1) and the merchant 124. The payment system 116 can communicate the generated cart to the online store 122, where the communication can be performed using the token. Any communication between the online store 122 and the payment system 116 using the token is authenticated, e.g., encrypted, secure, and between verified entities (i.e., the payment system 116 and the merchant 124). The authenticated communication can include communication by the payment system 116 providing the cart, and/or a payment for the cart, to the online store 122. In some embodiments, the payment system 116 can generate the token prior to the payment system 116 linking the user payment account with a chat account of the chat application instance 112(1). In some embodiments, the user payment account at the payment system 116 can be linked with the chat account for the chat application instance 112(1) prior to the payment system 116 generating the token.

At 214, the bot application provides, via the chat bot, an indication of the cart to the chat session for obtaining, from the chat application instance, an authorization to order the cart. With reference to FIG. 1, the bot application 104 can provide, via the chat bot 102, the indication to the chat session 106. The indication can be intended for receipt by the chat application instance 112(1). The indication can cause the UI 120(1) of the user device 114(1) to display a prompt for authorizing an order (e.g., authorizing a purchase) of the cart.

Figure 4:
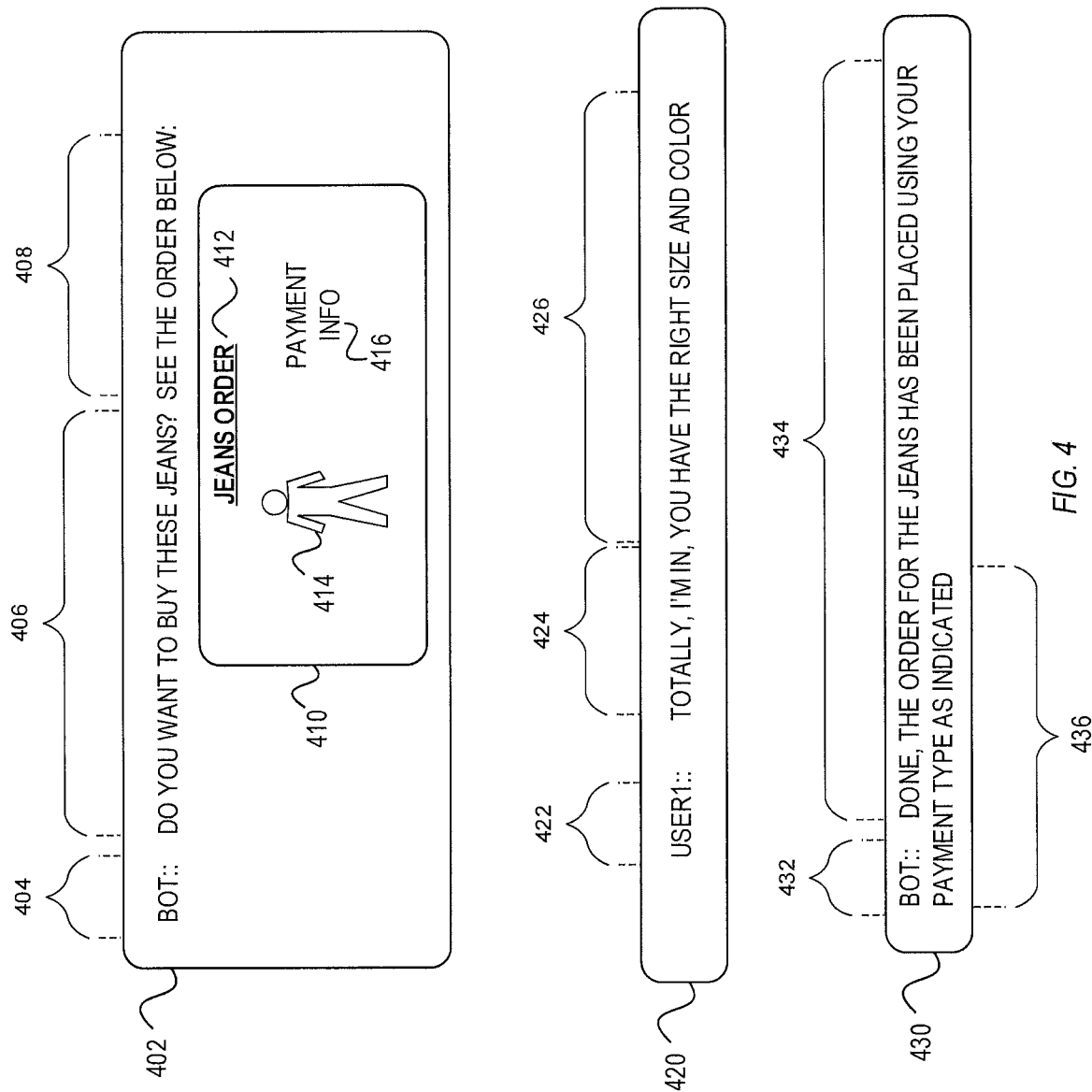

The bot application 104 can generate the indication by accessing the cart and generating an image of the cart. With reference to FIG. 4, the bot application 104 can generate an indication 410 that includes the image of the cart. The indication 410 can include one or more of a price for the order, payment information, and a shipping address. The indication can show at least some of the product features, such as by showing the product at portion 414, including user-selected product features such as product type, color, and/or size, among others. The indication can provide a similar image if the cart includes a service. The image of the cart can be provided by the bot application 104, via the chat bot 102, to the chat session 106 using an image file, a link to the image file, a locator to the image file. The image of the cart can be embedded in a chat text by the bot application 104, via the chat bot 102.

The bot application 104 can access, via the chat bot 102, another chat text provided via the chat session by the first chat application instance. The another chat text can indicate an authorization of purchase of the cart. Upon the bot application 104 determining, based on the second chat text, the authorization of the order of the cart, the bot application 104 can communicate the cart to the online store 122. The bot application 104 can also trigger the payment system 116 to communicate the cart to the online store 122.

In some embodiments, the bot application 104 can allow, based on the chat texts, another user to purchase the product. The bot application 104 can determine, based on replies from another chat application instance, such as the chat application instance 112(2), a purchase intent by a user of the user device 114(2) to purchase the product. The bot application 104 can thus generate another cart that is associated with the chat application instance 112(2). The bot application 104 can then provide another indication of the another cart to obtain authorization by another user to purchase another cart.

FIGS. 3 and 4 illustrate embodiments of communication for accessing chat sessions for cart generation via a chat bot. With reference to FIG. 3, chat text 302 illustrates a chat text that can be provided, by the chat application instance 112(1), to the chat session 106. Chat text 330 illustrates a chat text that can be provided, by the chat application instance 112(2), to the chat session 106. Chat text 350 illustrates a chat text that can be transmitted, via the chat bot 102 of the bot application 104, to the chat session 106. It is noted that in another example, the chat application instance 112(1) can provide the content of the chat texts 302 and 350 as a single chat text.

The chat text 302 can include chat text portions (also referred to as "portions") 308-320. The bot application 104 can access, via the chat bot 102, the chat text 302 and parse the various portions 308-320, such as to determine a locator, interest, and/or intent of the user. The bot application 104 can similarly access and parse portions of, the chat texts 330 and 350. In the depicted example embodiments, the portion 308 of "user1:" indicates that the chat application instance 112(1) is transmitting the chat text 302. The portion 310 of "I really like" can indicate (e.g., as parsed and determined by the bot application 104) general interest by the user. The portion 314 of "jeans" can indicate a product. The portion 316 of "at store X" can indicate a merchant. The portion 317 of "check them out" can be used to determine additional general interest by the user. Contents of the portion 320 can be generated by the social media service 110 based on the locator (e.g., such as by using associated session tags) provided by the chat application instance 112(1) in the chat session 106. The portion 320 can include an image 322 of the product and a description 318 of the product.

The chat text 330 can include portions 332 and 334. The portion 332 of "user2:" indicates that the chat application instance 112(2) is transmitting the chat text 330. The portion 334 of "Sweet, looking good, you gonna buy them" can be used to determine general interest by the user of the chat application instance 112(1) (and optionally of another user of the chat application instance 112(2)). The chat text 350 can include portions 352, 354, and 360. The portion 352 of "user1:" indicates that the chat application instance 112(1) is transmitting the chat text 350. The portion 354 of "Totally, I would buy them" can be used to determine purchase intent by the user of the chat application instance 112(1) to purchase the product. The portion 360 of "in blue" can indicate a desired product feature by the user.

With reference to FIG. 4, chat texts 402 and 430 illustrate chat texts that can be transmitted by the bot application 104, via the chat bot 102, to the chat session 106. Chat text 420 illustrates a chat text that can be provided, by the chat application instance 112(1), to the chat session 106.

The chat text 402 can include portions 406-416. In the depicted example embodiment, the portion 404 of "bot:" indicates that the chat bot 102 is transmitting the chat text 402. The portion 406 of "Do you want to buy these jeans?" is generated by the bot application 104 to as an indication of the cart and to obtain user authorization to order the cart. The portion 408 of "See the order below" is a prompt for the user to examine the cart. The portion 410 can be the indication of the cart. The portion 414 can be implemented as an image of the product. The portion 410 can be processed by the social media service 110 to display the image of the product 414 and product features. The portion 410 can be implemented as an image of the cart, and display the product 414 and product features of the cart. The portion 416 can display payment type, payment information, and/or other information associated with the cart.

The chat text 420 can include portions 422-426. The portion 422 of "user1:" indicates that the chat application instance 112(1) is transmitting the chat text 420. The portion 424 of "Totally, I'm in" can indicate an authorization to order the cart by the user. The portion 426 of "you have the right size and color" can indicate to the bot application 104 that the indication of 410 has the correct product, product features, and payment information (among other elements that may be shown by the indication of 410).

The chat text 430 can include portions 432 and 426. In the depicted example embodiment, the portion 432 of "bot:" indicates that the chat bot 102 is transmitting the chat text 430. The portion 434 of "Done, the order for the jeans has been placed using" is generated by the bot application 104 to indicate success of the order placement, i.e., of the cart submission to the online store 122. The portion 436 of "payment type as indicated" is generated by the bot application 104 and can indicate payment type used for purchasing the cart.

Figure 5:
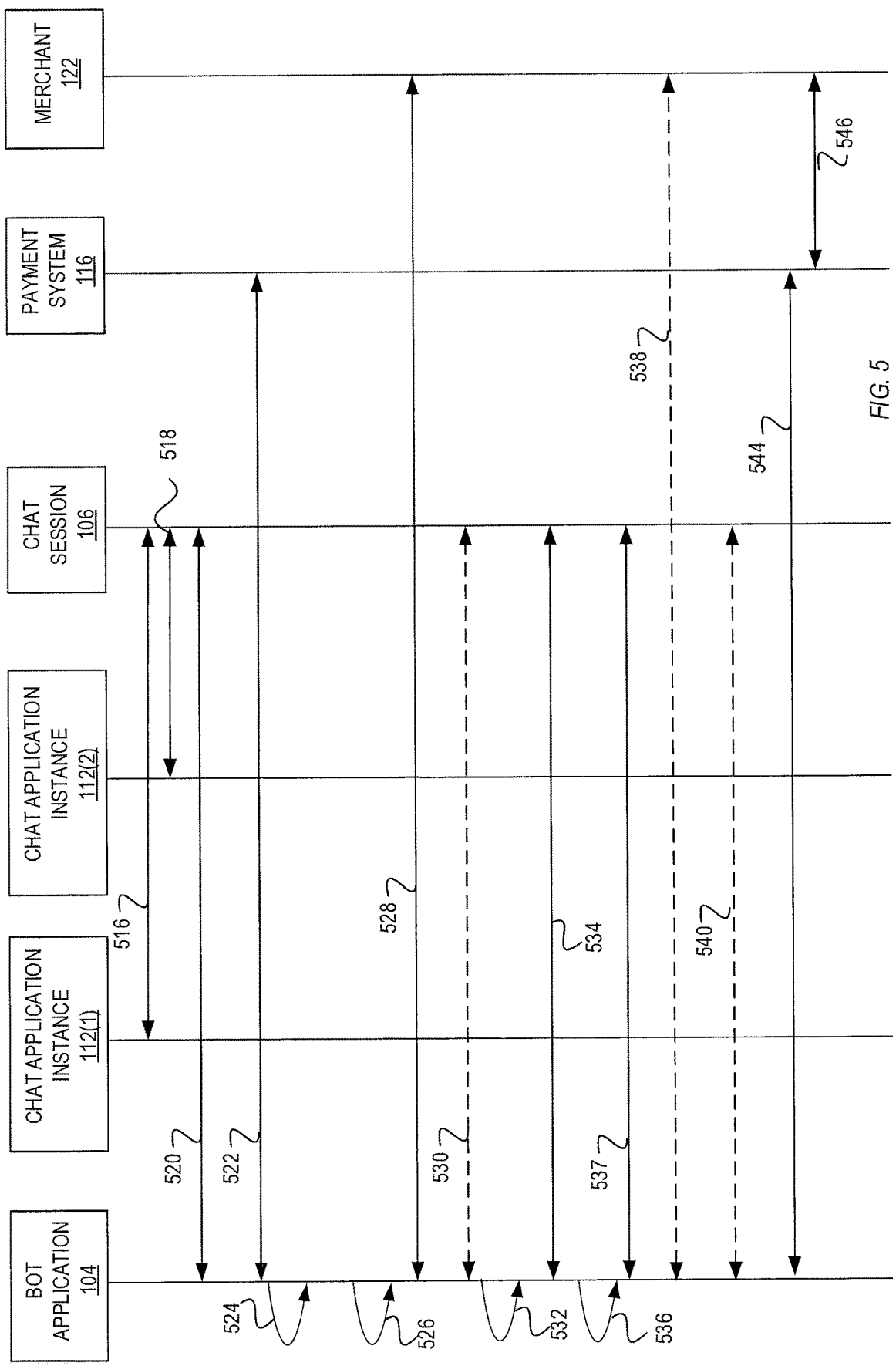
FIG. 5 is a timing diagram illustrating one embodiment of communication between a bot application and chat application instances via a chat session for accessing chat sessions for cart generation.

FIG. 5 is a timing diagram illustrating one embodiment of communication between a bot application and chat application instances via a chat session for accessing chat sessions for cart generation. As shown by FIG. 5, the bot application 104 communicates, via a chat bot (not shown), with the chat application instances 112(1) and 112(2) using the chat session 106. The bot application 104 also communicates with the payment system 116 and the merchant 124. The communications of FIG. 5 can be performed over one or more communication networks. Portions of the timing diagram of FIG. 5 correspond to the flow diagram of FIG. 2.

At 516, the chat application instance 112(1) provides a chat text to the chat session 106. For example, the chat text at 516 can include at least a portion of the contents of the chat texts 302 and 350. At 518, the chat application instance 112(2) provides a chat text to the chat session 106. For example, the chat text at 518 can include the contents of the chat text 330. At 520, the bot application 104 can access the chat texts (of 516 and/or 518). At 524, the bot application 104 can determine purchase intent for purchasing a product from the merchant 124 based on analysis of the chat texts of 516 and/or 518. At 526, the bot application 104 can, in response to determining the purchase intent, determine a locator for an online store of the merchant 124.

At 528, the bot application 104 can access, using the locator, the online store of the merchant 124 to determine product features of the product. At 530, the bot application 104 can, optionally, communicate with the chat application instance 112(1), via the chat session 106, to determine additional product features of the product. At 532, the bot application 104 can generate, based on the product features and the chat text (of 516 and/or 518), a cart for an order of the product for the online store.

At 534, the bot application 104 can provide an indication of the cart to the chat session 106 for obtaining authorization to order the cart. At 534, the bot application can also access another chat text from the chat application instance 112(1). At 536 the bot application 104 can determine based on the chat text of 534, the authorization to order the cart. At 538, the bot application 104 can, in response to determining the authorization, communicating the cart to the online store 122 of the merchant 124. At 540, the bot application 104 can provide an indication to the chat application instance 112(1), via the chat session 106, of an order being placed for the cart. At 544, the bot application 104 can communicate with the payment system to provide the payment for the cart to the merchant. At 546, the payment system 116 can provide an indication to the merchant that the payment has been processed (e.g., funds for the payment have been transferred from the payment account of a user linked with the chat application instance 112(1) to the merchant's payment account).

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the diagrams of FIGS. 2 and 5 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 6:
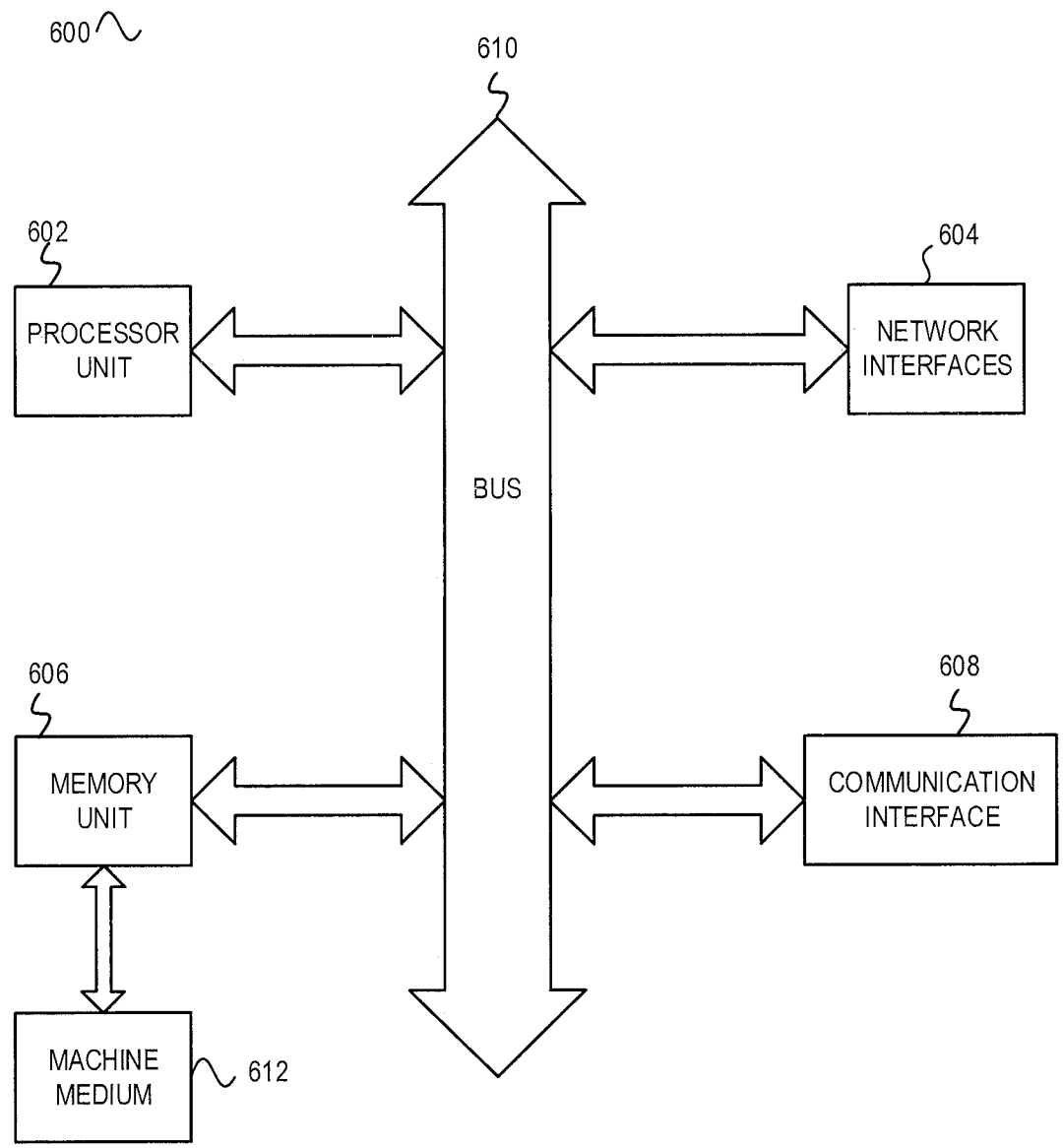
FIG. 6 is a block diagram of one embodiment of an electronic device used in the communication systems of FIGS. 1 and 5.

FIG. 6 is a block diagram of an exemplary embodiment of an electronic device 600 including a communication interface 608 for network communications. The electronic device can embody functionality to implement embodiments described in FIGS. 1-5 above. In some implementations, the electronic device 600 may be a laptop computer, a tablet computer, a mobile phone, a powerline communication device, a smart appliance (PDA), a server, and/or one or more another electronic systems. For example, a user device may be implemented using a mobile device, such as a mobile phone or a tablet computer. For example, a payment system may be implemented using one or more servers. The electronic device 600 can include a processor unit 602 (possibly including multiple processors, multiple cores, multiple nodes, and/or implementing multi-threading, etc.). The electronic device 600 can also include a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 can also include the bus 610 (e.g., PCI, ISA, PCI-Express, HyperTransport®, InfiniBand®, NuBus, AHB, AXI, etc.), and network interfaces 604 can include wire-based interfaces (e.g., an Ethernet interface, a powerline communication interface, etc.). The communication interface 608 can include at least one of a wireless network interface (e.g., a WLAN interface, a Bluetooth interface, a WiMAX interface, a ZigBee interface, a Wireless USB interface, etc.), In some implementations, the electronic device 600 may support multiple network interfaces—each of which is configured to couple the electronic device 600 to a different communication network.

The memory unit 606 can embody functionality to implement embodiments described in FIGS. 1-5 above. In one embodiment, the memory unit 606 can include one or more of functionalities that facilitate communicating in chat sessions using chat bots for cart generation. Any one of these functionalities may be partially (or entirely) implemented in hardware and/or on the processor unit 602. For example, some functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, the network interface 604 and the communication interface 608 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the present disclosure is not limited to them. In general, techniques for using chat bots as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for accessing communication in chat sessions for cart generation, the method comprising:
   detecting, by one or more hardware processors via a chat bot, an image being provided in a chat session by a first chat application instance to a second chat application instance;
   determining, by the one or more hardware processors, a product from a merchant by comparing the image to a plurality of webpages associated with a plurality of merchant websites;
   monitoring, by the one or more hardware processors, communications between the first and second chat application instances in the chat session;
   determining, by the one or more hardware processors, that an interest level of a user of the first chat application instance with respect to the product is greater than a threshold level based on analyzing the communications;
   in response to determining that the interest level of the user is greater than the threshold level, determining, by the one or more hardware processors, a locator for an online store of the merchant;
   accessing, by the one or more hardware processors using the locator, the online store to determine product configuration options of the product, wherein the production configuration options comprise at least one of a size or a color of the product;
   extracting one or more keywords from the communications that match descriptions of the product configuration options of the product;
   deriving, by the one or more hardware processors, a product configuration of the product for the user based on the extracted one or more keywords;
   generating, by the one or more hardware processors based on the product and the derived product configuration, a cart for an order of the product for the online store;
   providing, by the one or more hardware processors via the chat bot, an indication of the cart to the chat session;
   determining a user payment account associated with the user based on an identifier associated with the first chat application instance;
   generating an order token based on the cart and based on financial information associated with the user payment account; and
   transmitting, by the one or more hardware processors, the order token to the online store for purchasing the product.

2. The method of claim 1, further comprising:
   subsequent to providing the indication of the cart to the chat session, accessing, via the chat bot, a chat text provided by the first chat application instance; and
   determining, based on the chat text, an authorization to order the cart, wherein the order token is generated and transmitted to the online store in response to determining the authorization.

3. The method of claim 1, further comprising:
   applying natural language processing on the communications between the first and second chat application instances.

4. The method of claim 1, wherein the determining the locator for the online store comprises:
   determining a candidate webpage of the merchant based on the image;
   comparing the candidate webpage with the image; and
   determining the locator based on the comparing.

5. The method of claim 1, wherein the determining the locator for the online store comprises:
   determining that the merchant has a merchant payment account with a payment system; and
   determining the locator based on the merchant payment account.

6. The method of claim 1, wherein the accessing the online store to determine the product configuration options comprises:
   accessing a product webpage for the product at the online store; and
   accessing a plurality of tags from the product webpage to determine a plurality of possible product configurations for the product at the online store.

7. The method of claim 1, wherein the order token is associated with a payment system configured to transfer funds from a user payment account to the merchant.

8. The method of claim 1, further comprising:
   determining a merchant payment account with a payment system that is linked with the merchant.

9. The method of claim 8, further comprising:
   receiving a payment request for purchasing the product from the merchant;
   determining that the payment request includes the order token; and
   in response to determining that the payment request includes the order token, transferring funds from the user payment account to the merchant payment account.

10. The method of claim 1, wherein the indication of the cart comprises at least one of a representation of the product, a price of the product, the production configuration of the product, a shipping address, or a payment method.

11. A system comprising:
   a non-transitory memory storing instructions; and
   one or more hardware processors coupled to the non-transitory memory and configured to execute the instructions to cause the system to perform operations comprising:
      detecting, via a chat bot, that an image being communicated in a chat session between a first chat application instance and a second chat application instance, the chat session hosted by a chat service to facilitate communication between the first and second chat application instances;
      determining a product from a merchant by comparing the image to a plurality of webpage images associated with a plurality of merchant websites;
      monitoring one or more communications between the first and second chat application instances in the chat session;
      determining that an interest level of a user of the first chat application instance with respect to the product is greater than a threshold level based on analyzing the one or more communications;
      in response to determining that the interest level of the user is greater than the threshold level, determining a network address associated with an online store of the merchant;
      determining product configuration options of the product by accessing the online store using the network address, wherein the production configuration options comprise at least one of a size or a color of the product;
      extracting one or more keywords from the one or more communications that match descriptions of the product configuration options of the product;
      deriving a product configuration of the product for the user based on the extracted one or more keywords;
      generating, based on the product and the derived product configuration, a cart for an order of the product for the online store;
      providing, via the chat bot, an indication of the cart to the chat session;
      determining a user payment account associated with the user based on an identifier associated with the first chat application instance;
      generating an order token based on the cart and based on financial information associated with the user payment account; and
      transmitting the order token to the online store for purchasing the product.

12. The system of claim 11, wherein the operations further comprise:
   subsequent to providing the indication of the cart to the chat session, accessing, via the chat bot, a chat text provided by the first chat application instance; and
   determining, based on the chat text, an authorization to order the cart, wherein the order token is generated and transmitted to the online store in response to determining the authorization.

13. The system of claim 11, wherein the cart is associated with a payment system.

14. The system of claim 11, wherein the operations further comprise:
   determining a merchant payment account with a payment system that is linked with the merchant;
   receiving a payment request for purchasing the product from the merchant;
   determining that the payment request includes the order token; and
   in response to determining that the payment request includes the order token, transferring funds from the user payment account to the merchant payment account.

15. The system of claim 11, wherein the indication of the cart comprises at least one of a representation of the product, a price of the product, the derived product configuration, a shipping address, or a payment method.

16. A non-transitory machine-readable medium having stored thereon machine-readable instructions executable to cause a machine to perform operations comprising:
   accessing, via a chat bot, an image provided in a chat session by a first chat application instance to a second chat application instance, the chat session hosted by a chat service to facilitate communication between the first and second chat application instances;
   determining that the image is associated with a product from a merchant by comparing the image to a plurality of webpage images associated with a plurality of merchant websites based;
   monitoring communications between the first and second chat application instances in the chat session;
   determining that an interest level of a user of the first chat application instance with respect to the product is greater than a threshold level based on analyzing the communications;

in response to determining that the interest level of the user is greater than the threshold level, determining a locator for an online store of the merchant;

accessing, using the locator, the online store to determine product configuration options of the product, wherein the production configuration options comprise at least one of a size or a color of the product;

deriving a product configuration of the product for the user based on the analyzing the communications between the first chat application instance and the second chat application instance and extracting one or more keywords from the communications that match descriptions of the product configuration options of the product;

generating, based on the product referred in the first chat text and the derived product configuration, a cart for an order of the product for the online store;

providing, via the chat bot, an indication of the cart to the chat session;

determining a user payment account associated with the user based on an identifier associated with the first chat application instance;

generating an order token based on the cart and based on financial information associated with the user payment account; and transmitting the order token to the online store for purchasing the product.

17. The non-transitory machine-readable medium of claim 16, wherein the operations further comprise:

subsequent to providing the indication of the cart to the chat session, accessing, via the chat bot, a chat text provided via the chat session by the first chat application instance; and determining, based on the chat text, an authorization to order the cart, wherein; the cart is transmitted to the online store in response to determining the authorization.

18. The non-transitory machine-readable medium of claim 16, wherein the cart is associated with a payment system.

19. The non-transitory machine-readable medium of claim 18, wherein the operations further comprise:

determining a merchant payment account with the payment system that is linked with the merchant;

receiving a payment request for purchasing the product from the merchant;

determining that the payment request includes the order token; and in response to determining that the payment request includes the order token, transferring funds from the user payment account to the merchant payment account.

20. The non-transitory machine-readable medium of claim 16, wherein the providing the indication of the cart to the chat session comprises:

generating a graphical representation of the cart that indicates at least one of a price of the order, the derived product configuration, a shipping address, or a payment method; and providing the graphical representation as the indication of the cart.

* * * * *